(12) United States Patent
Sakabe et al.

(10) Patent No.: US 11,150,000 B2
(45) Date of Patent: Oct. 19, 2021

(54) AIR-CONDITIONING APPARATUS HAVING A COMPRESSOR-MOTOR-CONNECTION SWITCHER

(71) Applicant: Mitsubishi Electric Corporation, Tokyo (JP)

(72) Inventors: Akinori Sakabe, Tokyo (JP); Masakazu Kondo, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 16/621,954

(22) PCT Filed: Aug. 17, 2017

(86) PCT No.: PCT/JP2017/029516
§ 371 (c)(1),
(2) Date: Dec. 12, 2019

(87) PCT Pub. No.: WO2019/035195
PCT Pub. Date: Feb. 21, 2019

(65) Prior Publication Data
US 2020/0173703 A1 Jun. 4, 2020

(51) Int. Cl.
*F25B 49/02* (2006.01)
*F25B 13/00* (2006.01)
*H02P 25/18* (2006.01)

(52) U.S. Cl.
CPC .......... *F25B 49/025* (2013.01); *F25B 13/00* (2013.01); *H02P 25/184* (2013.01);
(Continued)

(58) Field of Classification Search
CPC .......... F24F 11/88; F25B 49/02; F25B 49/022; F25B 49/025; F25B 2600/021; F25B 2600/024
See application file for complete search history.

(56) References Cited

FOREIGN PATENT DOCUMENTS

| JP | 2002-061925 A | 2/2002 |
|---|---|---|
| JP | 2009-216324 A | 9/2009 |

(Continued)

OTHER PUBLICATIONS

International Search Report of the International Searching Authority dated Oct. 24, 2017 for the corresponding international application No. PCT/JP2017/029516 (and English translation).

(Continued)

*Primary Examiner* — Jonathan Bradford
(74) *Attorney, Agent, or Firm* — Posz Law Group, PLC

(57) ABSTRACT

An air-conditioning apparatus including a compressor incorporating an electric motor; a temperature sensor configured to detect indoor temperature; a drive circuit configured to drive the electric motor; a connection switching device configured to switch connection of stator windings of the electric motor between a first connection state and a second connection state higher in line-to-line voltage than the first connection state; and a controller configured to enter thermo-off when the indoor temperature reaches a target temperature or a correction temperature set based on the target temperature and cause the connection switching device to switch connection, the thermo-off being entered by stopping the compressor via the drive circuit. When a thermo-off count reaches a reference count with the electric motor being in the first connection state, the controller causes the connection switching device to switch connection from the first connection state to the second connection state.

11 Claims, 14 Drawing Sheets

(52) U.S. Cl.
CPC . *F25B 2313/0315* (2013.01); *F25B 2600/024* (2013.01); *F25B 2600/0251* (2013.01); *F25B 2700/2104* (2013.01); *F25B 2700/2115* (2013.01)

(56) References Cited

FOREIGN PATENT DOCUMENTS

| | | | |
|---|---|---|---|
| JP | 2011-067079 | A | 3/2011 |
| JP | 4722069 | B2 | 7/2011 |
| JP | 2012-029416 | A | 2/2012 |
| JP | 5501132 | B2 | 5/2014 |

OTHER PUBLICATIONS

Office Action dated Sep. 1, 2020 issued in corresponding JP patent application No. 2019-536390 (and English translation).
Extended European Search Report dated Jun. 4, 2020 issued in the corresponding EP patent application No. 17921841.7.
Chinese Office Action dated Dec. 28, 2020, issued in corresponding Chinese Patent Application No. 201780093889.4 (and English Machine Translation).

AIR-CONDITIONING APPARATUS HAVING A COMPRESSOR-MOTOR-CONNECTION SWITCHER

CROSS REFERENCE TO RELATED APPLICATION

This application is a U.S. national stage application of PCT/JP2017/029516 filed on Aug. 17, 2017, the contents of which are incorporated herein by reference.

TECHNICAL FIELD

The present invention relates to an air-conditioning apparatus equipped with a compressor, and more particularly, to connection switching of stator windings of an electric motor incorporated in the compressor.

BACKGROUND ART

Generally, the largest proportion of electric power needed for operation of an air-conditioning apparatus is consumed by a compressor, and consequently, energy efficiency of the air-conditioning apparatus depends greatly on the compressor. In recent years, houses have become increasingly airtight and thermally insulated, increasing occurrence frequency of a low-load region, and in particular, operation efficiency of compressors during low-speed operation of the compressors has been increasing in importance. On the other hand, considering situations such as quick startup of cooling in extreme heat and quick startup of heating at very low outside temperature, it is not that demand for high capacity achieved by increasing the rotational speed of the compressor to the limit has declined. That is, recent air-conditioning apparatuses are required to satisfy two extremes of energy efficiency in a low-load region and high capacity in a high-load region, and technology aimed at combining increased operation efficiency and an expanded range of movement of the compressor has been under development.

Incidentally, as an electric motor for a compressor, a permanent magnet motor driven by an inverter is in common use, where the permanent magnet motor uses permanent magnets for a rotor. The permanent magnet motor, which can operate on a small amount of current if the number of turns in stator windings is increased, is capable of high-efficiency operation with inverter losses due to current being reduced. On the other hand, there is a problem in that an induced voltage increases, causing a motor voltage to reach a maximum output voltage of the inverter at a relatively low rotational speed and disabling the motor from operating at a higher rotational speed. Conversely, with the permanent magnet motor, if the number of turns in the stator windings is decreased, the induced voltage decreases, allowing the motor to operate at up to a higher rotational speed, but there is a problem in that a stator current increases, increasing inverter losses. In this way, permanent magnet motors that have high efficiency at low-speed rotation cannot operate at up to high-speed rotation and permanent magnet motors that can operate at up to high-speed rotation have low efficiency at low-speed rotation.

To solve this problem, a system has been proposed that switches winding specifications of an electric motor depending on whether the motor is operating in a low-load region or high-load region. For example, Patent Literature 1 proposes a system provided with a connection switching device configured to switch a connection method for stator windings of an electric motor between a star connection and delta connection in response to instructions. With this system, when an operating frequency of the electric motor is lower than a predetermined frequency, the star connection suitable for a low-speed range of a compressor is selected, and when the operating frequency is equal to or higher than the predetermined frequency, the delta connection suitable for a high-speed range of the compressor is selected. Also, Patent Literature 2 proposes a system that switches a coil connection in each phase between a serial connection and parallel connection according to a deviation between a set temperature of an indoor unit and room temperature.

CITATION LIST

Patent Literature

Patent Literature 1: Japanese Patent No. 4722069
Patent Literature 2: Japanese Patent No. 5501132

SUMMARY OF INVENTION

Technical Problem

However, in both Patent Literature 1 and Patent Literature 2, regarding connection switching, it is necessary to perform a switching operation with operation of the compressor stopped by stopping inverter output from the viewpoint of product safety. In this case, the connection switching always involves a shutdown. Consequently, in practical use, even if energy efficiency in a low-load region and high capacity in a high-load region are fully satisfied, a function to maintain comfort, which is an essential function of the air-conditioning apparatus, might be impaired considerably.

The present invention has been made in view of the above problems and has an object to provide an air-conditioning apparatus that combines energy efficiency in a low-load region and high capacity in a high-load region without impairing user comfort.

Solution to Problem

An air-conditioning apparatus according to an embodiment of the present invention comprises: a compressor incorporating an electric motor; a temperature sensor configured to detect indoor temperature; a drive circuit configured to drive the electric motor; a connection switching device configured to switch connection of stator windings of the electric motor between a first connection state and a second connection state higher in line-to-line voltage than the first connection state; and a controller configured to enter thermo-off when the indoor temperature reaches a target temperature or a correction temperature set based on the target temperature and cause the connection switching device to switch connection, the thermo-off being entered by stopping the compressor via the drive circuit. Then, when a thermo-off count reaches a reference count with the electric motor being in the first connection state, the controller causes the connection switching device to switch the connection of the stator windings from the first connection state to the second connection state.

Advantageous Effects of Invention

The air-conditioning apparatus according to an embodiment of the present invention switches the electric motor from the first connection state to the second connection state higher in line-to-line voltage than the first connection state in synchronization with thermo-off. This allows connection to be switched without increasing stop frequency of the compressor from conventional stop frequency and thereby combines energy efficiency in a low-load region and high capacity in a high-load region without impairing user comfort.

DESCRIPTION OF EMBODIMENTS

An embodiment of the present invention will be described below with reference to the drawings. Description will be given below by taking as an example a case in which stator windings are connected by a delta connection in a first connection state while the stator windings are connected by a star connection in a second connection state. However, the types of first connection state and second connection state do not matter as long as a magnitude relationship between line-to-line voltages does not change. For example, even if a serial connection and parallel connection are combined as with Patent Literature 2, i.e., each phase of the stator windings is made up of plural windings, and in the first connection state, the stator windings are connected in parallel on a phase by phase basis while in the second connection state, the stator windings are connected in series on a phase by phase basis, similar effects are obtained.

Embodiment 1

Figure 1:
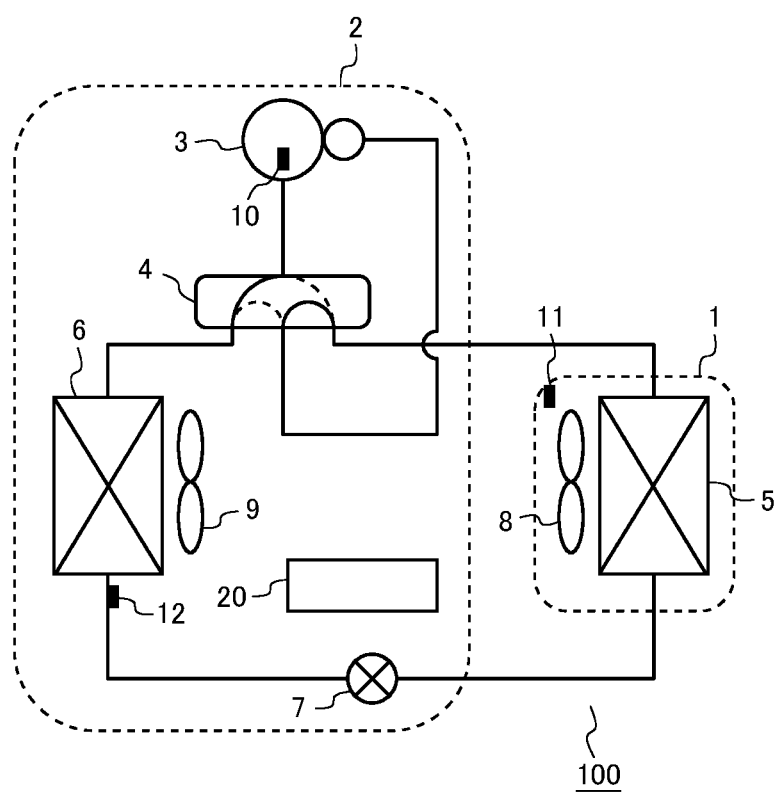
FIG. 1 is a schematic diagram showing a configuration example of a refrigerant circuit of an air-conditioning apparatus according to Embodiment 1 of the present invention.

FIG. 1 is a schematic diagram showing a configuration example of a refrigerant circuit of an air-conditioning apparatus according to Embodiment 1 of the present invention. The air-conditioning apparatus includes an indoor unit 1 placed on an indoor side to be air-conditioned and an outdoor unit 2 placed on an outdoor side. The indoor unit 1 includes an indoor-side heat exchanger 5. The outdoor unit 2 includes a compressor 3, a four-way valve 4, an outdoor-side heat exchanger 6, and an expansion valve 7. The compressor 3, four-way valve 4, outdoor-side heat exchanger 6, expansion valve 7, and indoor-side heat exchanger 5 are connected in an annular manner through refrigerant pipes, forming a refrigerant circuit 100. The four-way valve 4 is used to switch the air-conditioning apparatus between cooling operation and heating operation and is illustrated in FIG. 1 as having been switched to cooling operation. The refrigerant circuit 100 is filled with refrigerant. The type of refrigerant is not specifically limited. The indoor unit 1 further includes an indoor-side fan 8 for use to send air to the indoor-side heat exchanger 5. The indoor-side fan 8 is placed on the windward side of the indoor-side heat exchanger 5. Note that the indoor-side fan 8 may be placed on the leeward side of the indoor-side heat exchanger 5. The outdoor unit 2 further includes an outdoor-side fan 9 for use to send air to the outdoor-side heat exchanger 6. The outdoor-side fan 9 is placed on the leeward side of the outdoor-side heat exchanger 6. Note that the four-way valve 4 may be replaced by another selector valve having a similar function.

A temperature sensor 10 is attached to an outer shell of the compressor 3 of the outdoor unit 2. The temperature sensor 10 is used to detect temperature of the compressor 3. Note that the temperature sensor 10 may be installed in another location as long as the temperature of the compressor 3 can be estimated, and may be installed on a refrigerant pipe on a route from the compressor 3 to the four-way valve 4 instead of the outer shell of the compressor 3. A temperature sensor 11 is attached to the indoor unit 1 on the windward side of the indoor-side fan 8. The temperature sensor 11 is used to detect air temperature before inflow into the indoor-side heat exchanger 5, i.e., to detect room temperature. Note that the location of the temperature sensor 11 is not limited to the one shown in FIG. 1 as long as the room temperature can be detected. A temperature sensor 12 is attached to a pipe wall of a refrigerant pipe serving as a refrigerant inlet of the outdoor-side heat exchanger 6 during heating. The temperature sensor 12 is used to detect evaporating temperature when the outdoor-side heat exchanger 6 functions as an evaporator. According to the present embodiment, because the temperature detected by the temperature sensor 12 is used for defrosting operation, the temperature sensor 12 may be installed in another location as long as the temperature of the outdoor-side heat exchanger 6 can be estimated. Also, the number of temperature sensors is not limited to 3 shown in FIG. 1, and may be more than 3. Information on the temperatures detected by the temperature sensors 10 to 12 is outputted to a control board 20 provided in the outdoor unit 2. Details of the control board 20 will be described later.

Next, operation of the air-conditioning device of FIG. 1 will be outlined. As described above, refrigerant is enclosed in the refrigerant circuit 100 and is compressed by the compressor 3. During cooling, refrigerant compressed by the compressor 3 is condensed and liquefied by the outdoor-side heat exchanger 6, expanded by the expansion valve 7, and then evaporated by the indoor-side heat exchanger 5, subsequently returning to the compressor 3 and thereby going through a refrigeration cycle formed by a cooling circuit. During heating, refrigerant compressed by the compressor 3 is condensed and liquefied by the indoor-side heat exchanger 5, expanded by the expansion valve 7, and evaporated by the outdoor-side heat exchanger 6, subsequently returning to the compressor 3 and thereby going through a refrigeration cycle formed by a heating circuit.

When performing cooling or heating as described above, the air-conditioning device of FIG. 1 controls various parts such that the temperature detected by the indoor-side temperature sensor 11 will conform to a target value. That is, the air-conditioning device controls rotational speed of the compressor 3, an opening degree of the expansion valve 7, a volume of air sent by the indoor-side fan 8, and a volume of air sent by the outdoor-side fan 9. The control is performed based on the temperatures detected by the temperature sensor 10, temperature sensor 11, and temperature sensor 12 and cooling capacity or heating capacity is controlled. This control is performed by the control board 20 of the outdoor unit 2.

Figure 2:
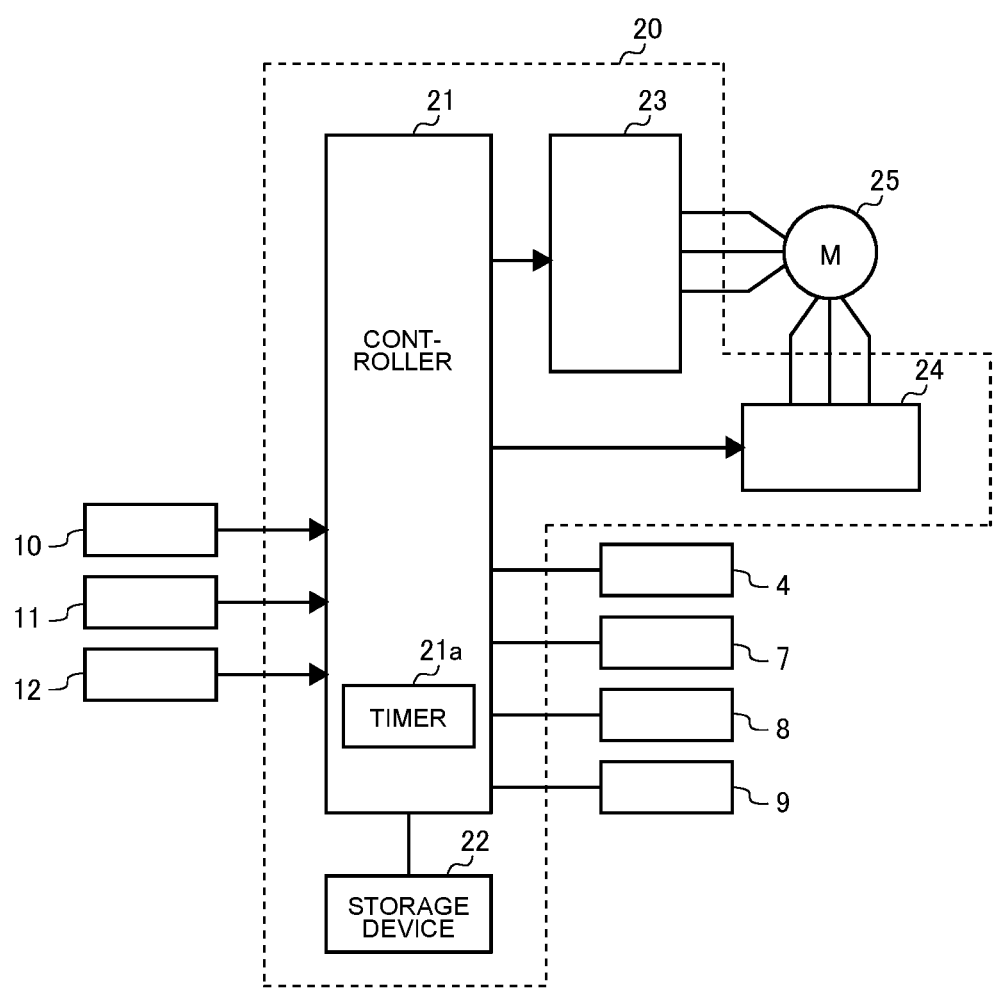
FIG. 2 is a control block diagram of a control system of the air-conditioning apparatus including a control board of FIG. 1.

FIG. 2 is a control block diagram of a control system of the air-conditioning apparatus including the control board 20 of FIG. 1. A controller 21, storage device 22, drive circuit 23, and connection switching device 24 are mounted on the control board 20. The controller 21 is made up of a microprocessor or DSP (digital analog processor). The controller 21 incorporates a timer 21a. The storage device 22 prestores a reference count of thermo-off and stores a thermo-off count, the times at which thermo-off occurred, and other similar data. The controller 21 is connected with the drive circuit 23. The controller 21 controls output frequency of a three-phase AC voltage outputted from the drive circuit 23. The drive circuit 23 outputs the three-phase AC voltage using an inverter and drives a three-phase permanent magnet motor 25 incorporated in the compressor 3. On instructions from the controller 21, the connection switching device 24 switches a connection method for the stator windings of the permanent magnet motor 25 from the delta connection to the star connection or from the star connection to the delta connection. Details of the connection switching device 24 will be described later. Note that the electric motor incorporated in the compressor 3 may be a three-phase motor other than a permanent magnet motor.

The air-conditioning apparatus of FIGS. 1 and 2 performs thermo-off control and defrosting operation such as described below. First, the thermo-off control and defrosting operation will be outlined.

(Thermo-Off Control)

In the case of heating operation, when the room temperature detected by the temperature sensor 11 exceeds a target temperature and reaches a thermo-off temperature, the controller 21 stops the compressor 3. Subsequently, when the room temperature falls below the target temperature and reaches a thermo-on temperature, the controller 21 resumes operation of the compressor 3. In the case of cooling operation, procedures are similar to the heating operation. When the room temperature detected by the temperature sensor 11 falls below a target temperature and reaches a thermo-off temperature, the controller 21 stops the compressor 3. Subsequently, when the room temperature exceeds a thermo-on temperature, the controller 21 resumes operation of the compressor 3. Note that thermo-off temperature is the target temperature+$\alpha$ in the case of heating, and the target temperature−$\alpha$ in the case of cooling. The thermo-on temperature is the target temperature−$\beta$ in the case of heating, and the target temperature+$\beta$ in the case of cooling. Here, $\alpha$ and $\beta$ are values set as appropriate to avoid hunting resulting from on-off action. The thermo-off temperature corresponds to a correction temperature of the present invention, and equals the target temperature when a is 0.

(Defrosting Operation)

Figure 3:
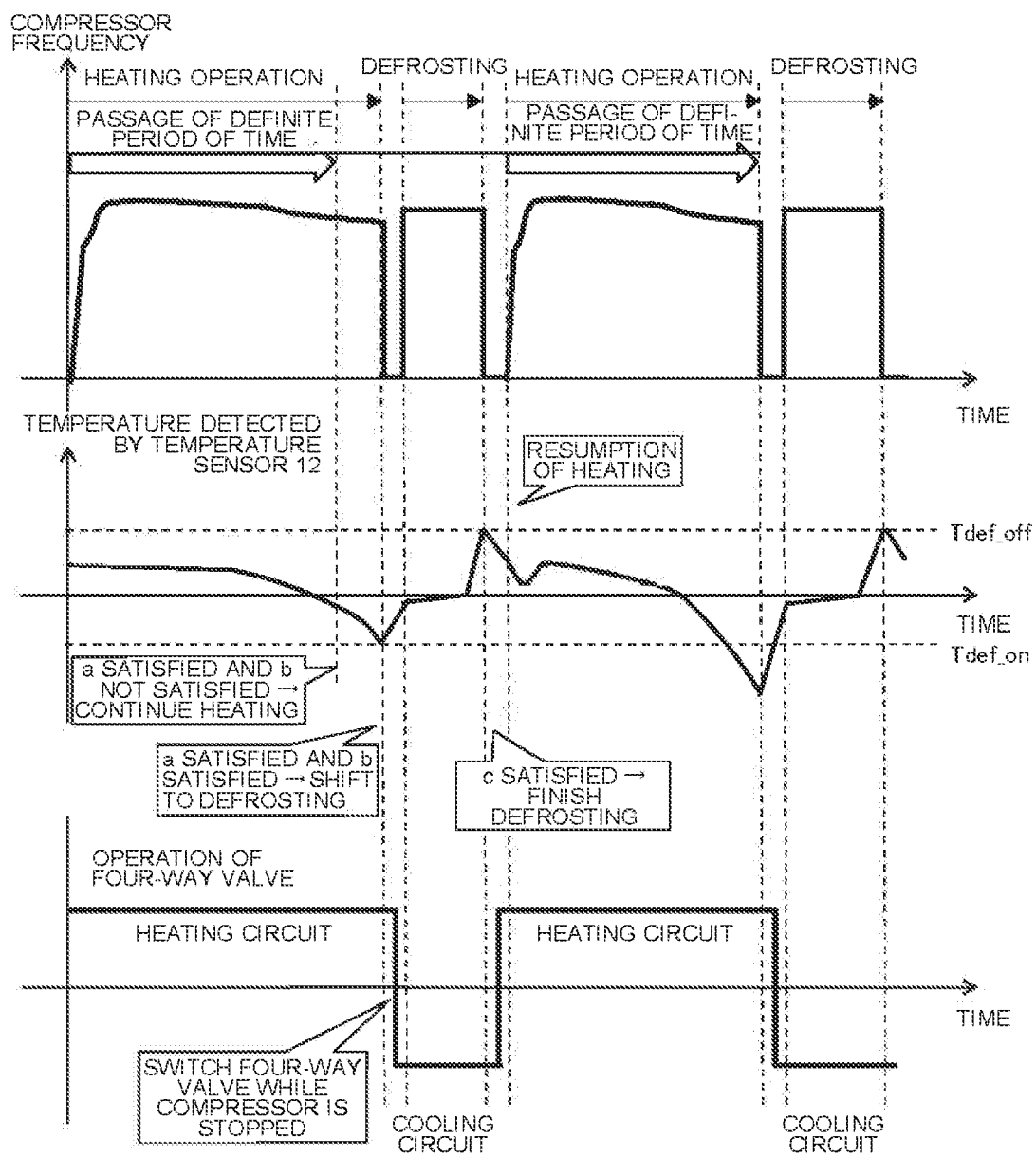
FIG. 3 is a timing chart of defrosting control.

FIG. 3 is a timing chart of defrosting control. The defrosting operation is an example of operation performed conventionally, and will be outlined below. After defrosting operation is finished, when a definite period of time elapses after resumption of heating operation (condition a) and the temperature detected by the temperature sensor 12 falls to or below a prescribed value Tdef_on (condition b), the controller 21 determines that conditions for starting defrosting operation are satisfied and starts defrosting operation. That is, the controller 21 determines that frost has formed on the outdoor-side heat exchanger 6 and starts defrosting operation.

In defrosting operation, after stopping the compressor 3, the controller 21 forms a cooling circuit by switching the four-way valve 4 and melts frost by a reverse defrosting method that involves restarting the compressor 3 and circulating the refrigerant. The defrosting operation is continued until the temperature detected by the temperature sensor 12 reaches or exceeds a prescribed value Tdef_off. When the temperature detected by the temperature sensor 12 reaches or exceeds the prescribed value Tdef_off (condition c), the controller 21 determines that a condition for finishing the defrosting operation is satisfied and finishes the defrosting operation. In finishing the defrosting operation, the controller 21 stops the compressor 3 first, returns to the heating circuit by switching the four-way valve 4, and resumes heating operation by restarting the compressor 3. Note that according to the present embodiment, when the stator windings of the permanent magnet motor 25 are star-connected, defrosting operation is also performed under other conditions in addition to the above conditions.

Figure 4:
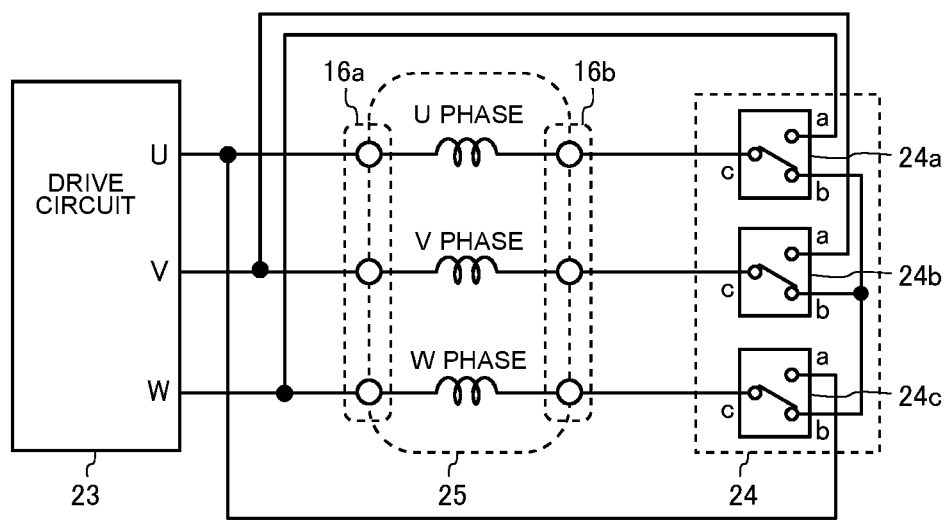
FIG. 4 is a circuit diagram showing an example of a connection switching device of FIG. 2, for stator windings of a compressor.
Figure 5:
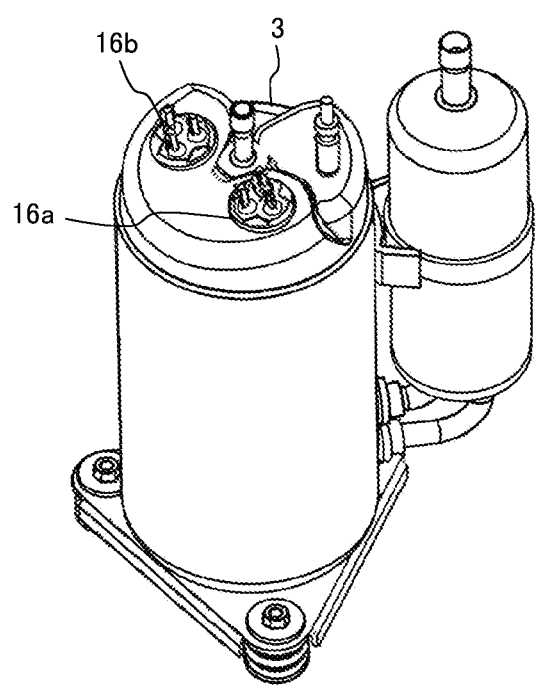
FIG. 5 is an external view of a compressor of FIG. 1.

FIG. 4 is a circuit diagram showing details of the connection switching device 24. FIG. 5 is an external view of the compressor 3. As described above, the compressor 3 incorporates the permanent magnet motor 25. The stator windings of the permanent magnet motor 25 are connected to the drive circuit 23 and connection switching device 24. Three C contact relays 24a, 24b, and 24c are used as the connection switching device 24. The permanent magnet motor 25 has six leads. The six leads are connected to the outside of the compressor 3 through glass terminals 16a and 16b shown in FIG. 5. Three of the six leads are connected to the drive circuit 23, and the remaining three leads are connected to the three C contact relays 24a, 24b, and 24c, respectively.

An a-contact of the C contact relay 24a is connected to a W phase output terminal of the drive circuit 23, and an a-contact of the C contact relay 24b is connected to a V phase output terminal of the drive circuit 23. An a-contact of the C contact relay 24c is connected to a U phase output terminal of the drive circuit 23. A b-contact of the C contact relay 24a, a b-contact of the C contact relay 24b, and a b-contact of the C contact relay 24c are connected with one another. In the connection switching device 24 configured in this way, the delta connection is formed when the relay contacts of the three C contact relays 24a, 24b, and 24c are switched to the a-contact side, and the star connection is formed when the relay contacts are switched to the b-contact side.

Incidentally, power is consumed when relay coils are energized. Generally, integral power consumption of the relays is reduced on an annual basis if relay coils are not energized in a low-speed range of the compressor, which occurs frequently. Thus, according to the present embodiment, the connection switching device 24 is configured such that the star connection will be used when the coils are not energized and that the delta connection will be used when the coils are energized. However, if frequency at which loads are generated differs from a general tendency, the connection switching device 24 may be configured such that the star connection will be used when the coils are energized and that the delta connection will be used when the coils are not energized.

The controller 21 performs capacity control in relation to an operating state of the refrigeration cycle based on the temperatures detected by the plural temperature sensors 10 to 12. In the course of the control if conditions for switching to the star connection are satisfied during operation with the delta connection the controller 21 switches the connection from the delta connection to the star connection by controlling the connection switching device 24. In this case, the relay contacts of the C contact relays 24a, 24b, and 24c of the connection switching device 24 are switched from the a-contacts to the b-contacts. On the other hand, if conditions for switching to the delta connection are satisfied during operation with the star connection, the controller 21 switches the connection from the star connection to the delta connection by controlling the connection switching device 24. In this case, the C contact relays 24a, 24b, and 24c of the connection switching device 24 are switched from the b-contacts to the a-contacts. Furthermore, at the same time with relay switching, the controller 21 switches various control constants used to drive the compressor 3. Note that relay switching is done when the compressor 3 is stopped by taking individual variation of the three relays and product safety into consideration.

Figure 18:
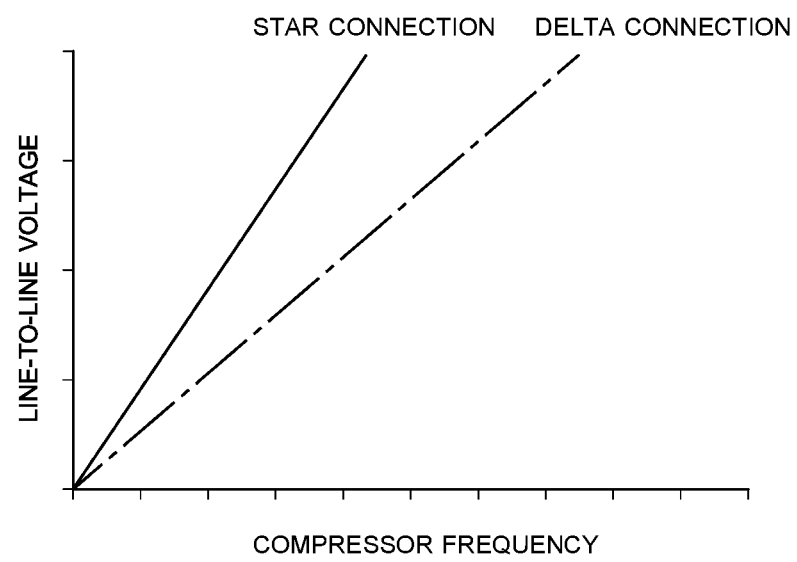
FIG. 18 is a characteristics curve showing a relationship between compressor frequency and line-to-line voltage in the case of a star connection and in the case of a delta connection.

Generally, when a line-to-line voltage is high, because an amount of current required to generate necessary torque is reduced, a motor has high efficiency, but undergoes an increase in an induced voltage. Furthermore, because the induced voltage is proportional to rotation speed, the line-to-line voltage reaches a maximum inverter output at a lower rotation speed. Conversely, when the line-to-line voltage is low, the motor can operate up to a higher rotation speed, but the current needed to generate necessary torque increases. For example, as shown in FIG. 18, it is a known fact that the line-to-line voltage in the star connection is higher than the line-to-line voltage in the delta connection, and is $\sqrt{3}$ times the delta connection. If the star connection that develops a high line-to-line voltage is used in a low-speed range, which occurs frequently, and switching is done to the delta connection with the low line-to-line voltage when high-speed rotation becomes necessary, demand for high capacity can be met while minimizing integral power consumption on an annual basis.

However, if a threshold is determined based solely on compressor frequency or inverter output voltage and switching is done between the delta connection and star connection each time the threshold is crossed, a shutdown has to be caused each time the determined threshold is crossed. Such a situation goes against the user's intent. Also, if operating time is used as a trigger, the compressor has to be stopped to switch the connection, which increases the number of compressor stops in a season as a whole compared to conventional cases, resulting in lower comfort than conventionally the case. Thus, it is desirable in maintaining comfort to synchronize connection switch timings with conventional compressor stop timings and thereby not to generate compressor stop timings more than conventionally the case.

Figure 6:
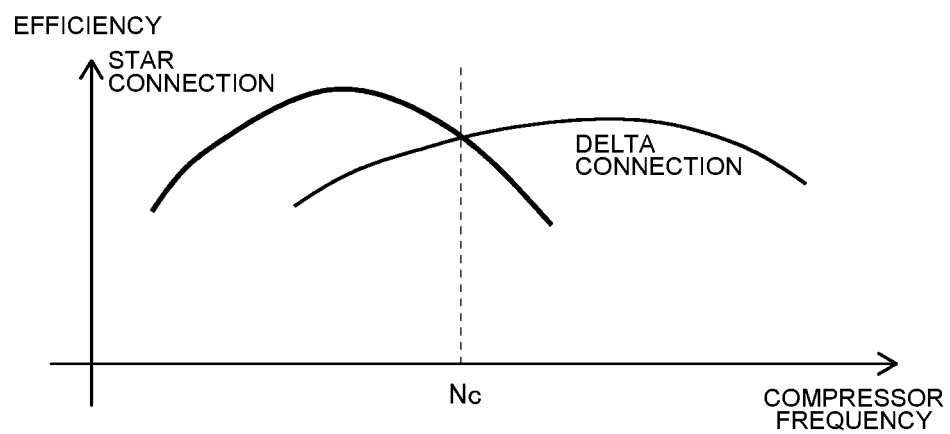
FIG. 6 is a schematic diagram showing efficiencies of a star connection and delta connection vs. compressor frequency as well as an intersection of efficiency curves.

Next, a technique for determining which of the star connection and delta connection is more effective in reducing power consumption will be described using FIG. 6. FIG. 6 is a schematic diagram showing efficiencies of a star connection and delta connection vs. compressor frequency as well as an intersection of efficiency curves. Compressor frequency can be used as one of criteria for determining whether operation with the star connection is more efficient than operation with the delta connection. The efficiencies of the star connection and delta connection form curves each having an efficiency peak and superiority in efficiency switches at an intersection (Nc) of the curves. Strictly speaking, the position of the intersection changes with environmental factors such as inside and outside temperatures, but the changes are negligible in considering reductions in annual power consumption under standard conditions, and do not affect the general trend. Regarding a frequency threshold for switching control between the star connection and delta connection, it is sufficient that one efficiency intersection under standard conditions is established as a representative point. When it is expected that operation will be continued at frequencies in excess of the frequency threshold, the use of the delta connection is continued. Conversely, when it is expected that operation below the frequency threshold will be predominant, the star connection is used as a principle.

Here, if a switching operation is performed depending only on whether the current compressor frequency is higher or lower than the operating frequency threshold as described above, the following problems arise. Erroneous determinations increase before operation stabilization such as right after the start of operation or at the time of sudden air conditioning load fluctuations, causing operation to be performed using a wrong connection. Also, so-called hunting in which the star connection and delta connection switch between each other repeatedly might occur, considerably impairing energy efficiency and comfort conversely. A connection switching operation provides higher efficiency and comfort as a whole if performed by waiting for the air-conditioning apparatus to enter stable operation.

In the present embodiment, connection is switched from the above viewpoint. Next, connection switching from the delta connection to the star connection and connection switching from the star connection to the delta connection will be described individually.

(Connection Switching from Delta Connection to Star Connection)

Figure 7:
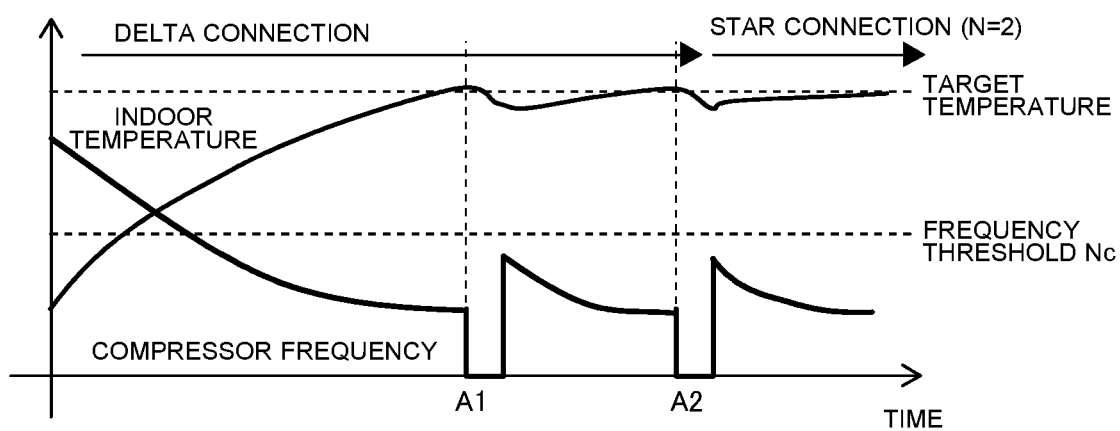
FIG. 7 is a schematic diagram showing an example of changes, with time, of compressor frequency in a low-load region during heating.

Conditions for switching from the delta connection to the star connection will be described below using FIG. 7. FIG. 7 is a schematic diagram showing an example of changes, with time, of compressor frequency in a low-load region during heating. As the room temperature detected by the temperature sensor 11 approaches a target temperature set by a user or a target temperature automatically set by the air-conditioning apparatus, the compressor frequency falls. When the room temperature exceeds the target temperature and approaches the thermo-off temperature sufficiently, to inhibit overshoot or undershoot in the room temperature and cut operating power at the same time, thermo-off occurs to stop the compressor 3 (A1, A2). Switching from the delta connection to the star connection during the thermo-off eliminates the need to add a compressor stop for connection switching.

At the start of operation, operation is started using the delta connection characterized by a high-speed range of the compressor, high efficiency, and a wide range of movement. Then, subsequent operating loads are estimated from the operating state, and when it is determined by the apparatus that the use of the star connection for subsequent operation will be more effective in cutting power consumption, connection is switched in synchronization with thermo-off. The thermo-off count is stored in the storage device 22 of the control board 20. Timing for switching from the delta connection to the star connection comes when it is determined that operation with the star connection will be effective in cutting power consumption. Specifically, this is when the number of compressor stops due to thermo-off reaches N times and the frequency just before the thermo-off is equal to or lower than the frequency threshold all the N times. During the Nth thermo-off, an operation of switching to the star connection is performed. In FIG. 7, N=2 as an example, but N may be an integer equal to or larger than 2 and may be set as appropriate according to housing performance.

Also, for example, if a long time passes from the first count to the Nth count there is no point in counting thermo-off cumulatively because it is likely that environmental conditions including outside temperature have changed. Thus, the condition that switching from the delta connection to the star connection is done if thermo-off occurs N times successively within a definite period of time is more appropriate. Also, if a shift to defrosting operation takes place before the thermo-off count reaches N, the thermo-off count is reset. That is, because air-conditioning conditions under which a shift to defrosting operation takes place often require high capacity, the delta connection is maintained.

Also, if thermo-off time continues for a long time, switching to the star connection may be done by determining that the load is low, i.e., high capacity operation is unnecessary even if the number of times has not reached N. In the operation with the star connection, a permanent magnet of the electric motor is demagnetized at high temperatures more easily than in the operation with the delta connection. If refrigerant leaks, operation is performed on low refrigerant and discharge temperature tends to rise. When the temperature detected by the temperature sensor 10, i.e., the temperature of the compressor 3, is equal to or higher than a reference temperature, even if the conditions for switching to the star connection are satisfied, switching to the star connection is not done from the viewpoint of compressor protection.

Figure 8:
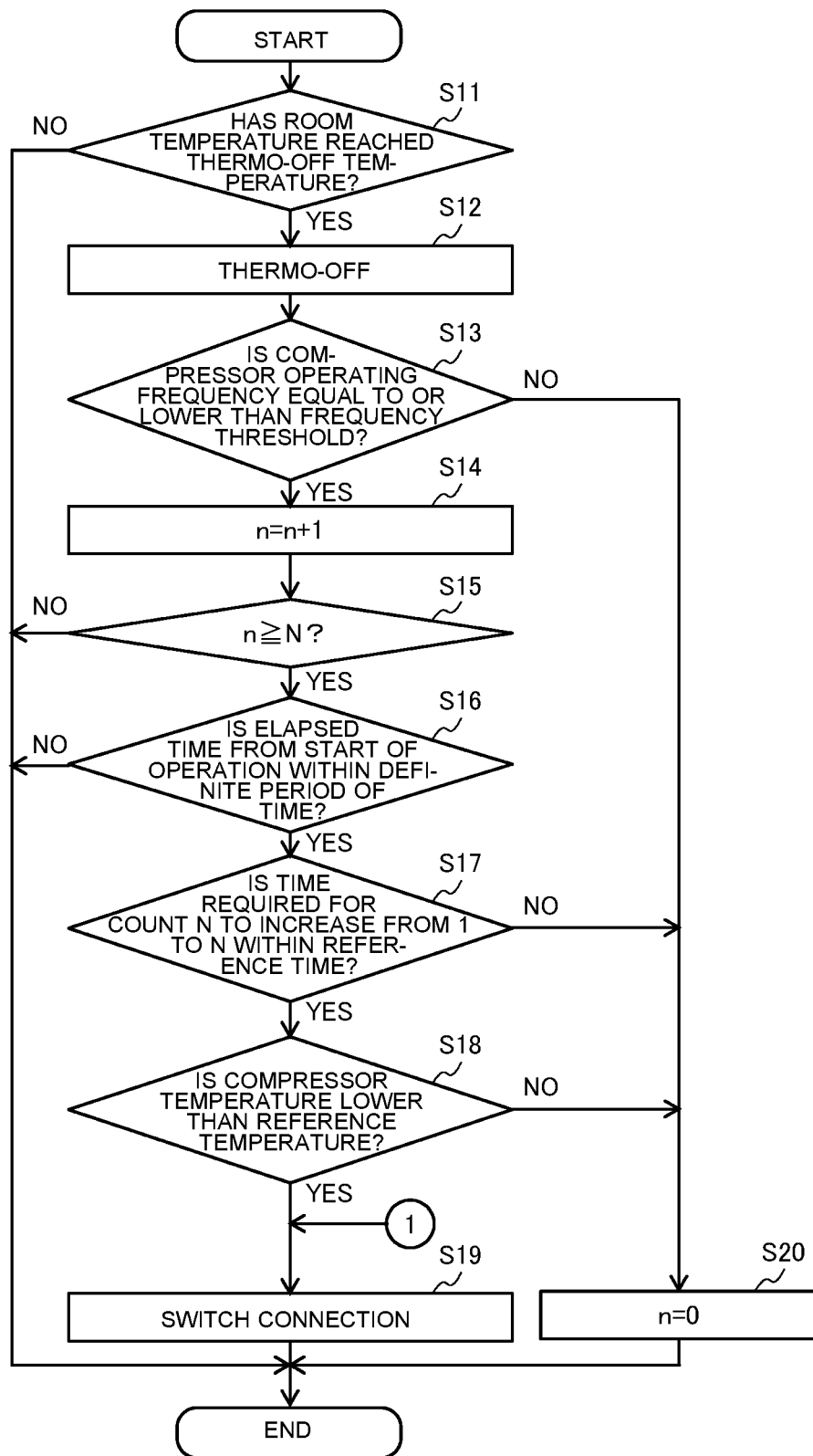
FIG. 8 is a flowchart (Part 1) of connection switching control for switching stator windings of the electric motor from a delta connection to a star connection, showing an example in which a thermo-off count and compressor frequency are used as conditions.
Figure 9:
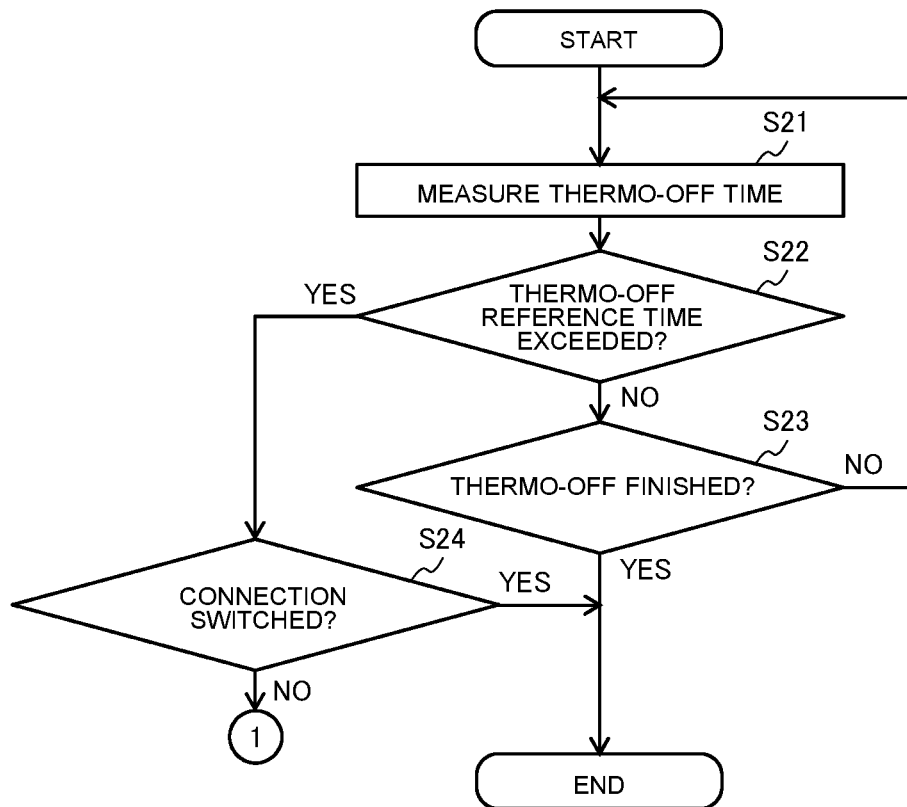
FIG. 9 is a flowchart (Part 2) of connection switching control for switching the stator windings of the electric motor from the delta connection to the star connection, showing an example in which thermo-off time is reflected as a switching condition.
Figure 10:
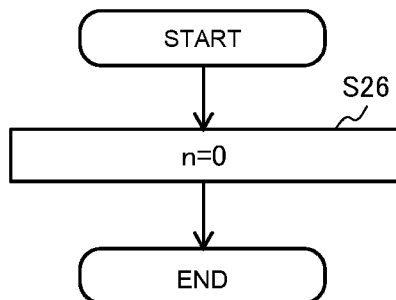
FIG. 10 is a flowchart (Part 3) of connection switching control for switching the stator windings of the electric motor from the delta connection to the star connection, showing an example in which a compressor stop is reflected as a switching condition.

The controller 21 performs connection switching control by reflecting the above-mentioned switching conditions and a process of the control will be described based on flowcharts. FIGS. 8 to 10 are flowcharts showing a control process performed by the controller when switching from the delta connection to the star connection, and computations for the control process are performed concurrently.

FIG. 8 is a flowchart (Part 1) of connection switching control for switching stator windings of the electric motor 25 from the delta connection to the star connection, showing an example in which the thermo-off count and compressor frequency are used as conditions. The controller 21 determines whether indoor temperature has reached the thermo-off temperature (S11) and enters thermo-off when the thermo-off temperature is reached (S12). With the compressor 3 stopped due to the thermo-off, the following processes are performed. The controller 21 determines whether the compressor frequency is equal to or lower than the frequency threshold at the time when the indoor temperature reaches the thermo-off temperature (or just before the thermo-off) (S13). When the compressor frequency is equal to or lower than the frequency threshold, the controller 21 increments the count n such that n=n+1 (S14). The count n is stored in the storage device 22 and the value of the count n is updated. In so doing, the value of the count n and the time at which the count n is reached are stored in the storage device 22 as well. The count n indicates the thermo-off count when the indoor temperature reaches the thermo-off temperature, resulting in thermo-off and the compressor frequency just before the thermo-off becomes equal to or lower than the frequency threshold. Next, the controller 21 determines whether the count n has reached a set value N (S15).

When it is determined that the count n has reached a set value N, next the controller 21 determines whether a definite period of time has passed at present since the start of operation of the air-conditioning apparatus (S16). Note that the definite period of time in step 16 (S16) corresponds to a third reference time of the present invention and is set from the viewpoint that a shift to connection switching control should take place after the air-conditioning apparatus enters stable operation. When it is determined that the definite period of time has passed at present since the start of operation, next the controller 21 determines whether the time required for the count n to increase from 1 to N was within a reference time (S17). The reference time in step 17 (S17) corresponds to a second reference time of the present invention and is set from the viewpoint of determining whether the load is low.

When it is determined that the time required for the count n to increase from 1 to N was within the definite period of time, next the controller 21 determines whether the temperature of the compressor 3 is lower than the reference temperature (S18). When it is determined that the temperature of the compressor 3 is equal to or lower than the reference temperature, the controller 21 switches from the delta connection to the star connection by controlling the connection switching device 24 (S19). Here, the C contact relays 24a, 24b, and 24c are switched from the b-contacts to the a-contacts. When the condition is not satisfied (NO) in the determination of any of steps 11, 15, 16 (S11, S15, S16), the processing is finished. Also, when the condition is not satisfied (NO) in any of steps 13, 17, 18 (S13, S17, S18), the controller 21 sets the count n to n=0 (S20) and finishes the process of S20. Note that when the determination in step 18

(S18) is NO, i.e., when the temperature of the compressor 3 is equal to or higher than the reference temperature, the process of S20 may be finished without setting the count n to n=0.

FIG. 9 is a flowchart (Part 2) of connection switching control for switching the stator windings of the electric motor from the delta connection to the star connection, showing an example in which thermo-off time is reflected as a switching condition. The process of the flowchart is started with a start of thermo-off serving as a trigger. When thermo-off is started (S12 in FIG. 8), the controller 21 measures the time duration of the thermo-off state (S21). The time measurement is continued until thermo-on (S23), and when it is determined that the measured time exceeds the reference time (S22), next it is determined whether a connection switching process has already been performed (S24). When it is determined that a connection switching process has not been performed yet, the controller 21 goes to step 19 (S19) of FIG. 8 and performs a connection switching process. Note that the reference time in step 22 (S22) corresponds to a first reference time of the present invention.

FIG. 10 is a flowchart (Part 3) of connection switching control for switching the stator windings of the electric motor from the delta connection to the star connection, showing an example in which a compressor stop is reflected as a switching condition. The process of the flowchart is started with a compressor stop serving as a trigger when the compressor stops due to defrosting or an abnormal condition. The controller 21 sets the count n to n=0, updates storage content of the storage device 22 (S26), and finishes the processing. Consequently, the count n in the flowchart of FIG. 8 is n=0. In this way, the count n is reset if the compressor stops due to defrosting or another factor between thermo-off and next thermo-off and connection is switched if thermo-off occurs N times continuously in the flowchart of FIG. 8. Note that when it is said that thermo-off occurs N times continuously, this means that the compressor does not stop due to another factor between thermo-off and next thermo-off.

The connection switching control described above is applied to either of heating operation and cooling operation. Step (S13) of FIG. 8 may be omitted and the switching process may be performed based solely on the thermo-off count. Also, in the above description, the fact that operation of the air-conditioning apparatus is being continued in a low-load region is determined based on continuous occurrence of thermo-off and operation in non-low-load region (i.e., high-load region) is determined based on occurrence of defrosting. However, if the air-conditioning apparatus has a means of detecting or estimating air conditioning loads, determination of air conditioning loads may be made based on detection information or estimation information on the air conditioning loads.

As described above, the present embodiment switches connection from the delta connection to the star connection, offering the following advantageous effects.

In the present embodiment, regarding the connection switching from the delta connection to the star connection, when the thermo-off count reaches a reference count N, the connection switching device 24 switches connection from the delta connection to the star connection during a thermo-off period. That is, switching from the delta connection to the star connection is done in synchronization with thermo-off. This makes it possible to switch connection without increasing stop frequency of the compressor 3 compared to conventional stop frequency and thereby reduce unpleasantness caused by a compressor stop during connection switching. Besides, the shift from the delta connection to the star connection improves energy efficiency. Also, accuracy of determination as to which connection is more appropriate for operation is increased. This makes it possible to reduce unnecessary connection switching and maintain comfort. In this way, the present embodiment combines energy efficiency in a low-load region and high capacity in a high-load region without impairing comfort.

Also, in the present embodiment, connection is switched when the thermo-off count reaches the reference count N and a state in which an operating frequency of the compressor 3 during thermo-off is equal to or lower than the frequency threshold continues to amount to the reference count N. In this way, connection is switched by taking into consideration the thermo-off count and the operating frequency of the compressor 3 during thermo-off. This further increases accuracy of determination on switching to the star connection, making it possible to combine energy efficiency in a low-load region and high capacity in a high-load region without impairing comfort.

Also, in the present embodiment, if thermo-off time reaches or exceeds the first reference time, connection is switched regardless of the thermo-off count and compressor frequency. When a duration of thermo-off reaches or exceeds a definite period of time, high capacity operation of the compressor 3 is unnecessary and connection is switched from the viewpoint of energy efficiency.

Also, in the present embodiment, if the second reference time is exceeded during a period from the first count of thermo-off until the reference count N is reached, the thermo-off count is reset. If a long period of time is required until the reference count N is reached, the compressor 3 is in a driving state that cannot be said to be in a low-load region. Therefore, the driving state with the stator windings delta-connected is maintained.

Also, in the present embodiment, when defrosting operation is performed to remove frost from the outdoor-side heat exchanger 6, the thermo-off count is reset. The fact that defrosting operation was performed means that the compressor 3 is not in a low-load state, and thus operation is continued with the stator windings delta-connected.

Also, in the present embodiment, for the third reference time after the start of operation of the air-conditioning apparatus until operation is stabilized, connection switching is not controlled regardless of the presence or absence of the switching conditions. This is because for a definite period of time after the start of operation of the air-conditioning apparatus, the operation is transitional and accuracy of load determination is low, and thus connection is switched when the operation is stabilized.

Also, according to the present embodiment, when the temperature of the compressor 3 is equal to or higher than a reference temperature, switching to the star connection is not done and operation is continued using the delta connection.

Also, according to the present embodiment, connection is switched in the thermo-off period in which the reference count is reached.

(Switching from Star Connection to Delta Connection)

Figure 11:
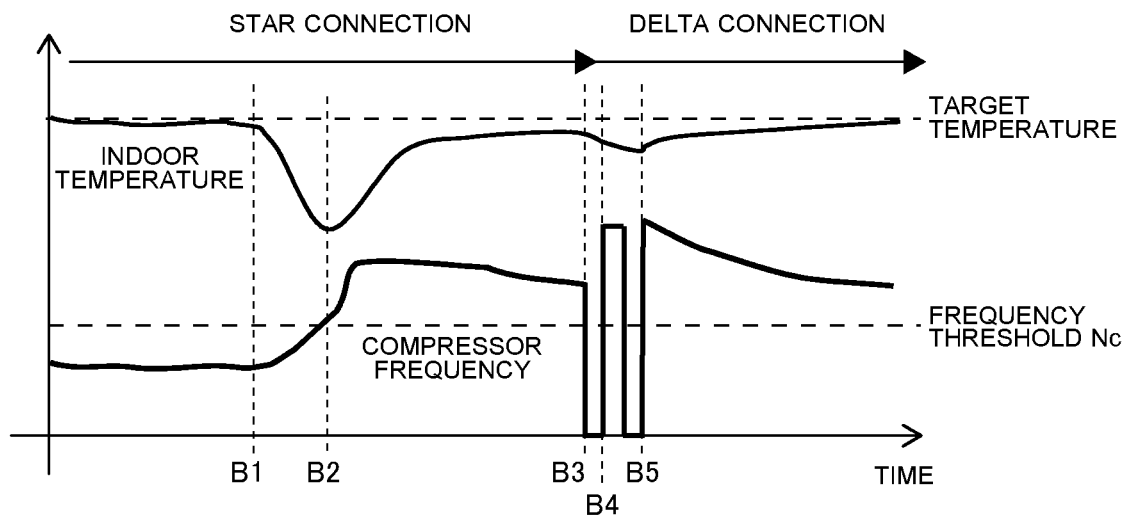
FIG. 11 is a schematic diagram showing an example of changes, with time, of compressor frequency during heating if load fluctuations occur.

Next, conditions for switching from the star connection to the delta connection will be described using FIGS. 11 and 12. FIG. 11 is a schematic diagram showing an example of changes, with time, of compressor frequency during heating if load fluctuations occur. After operation is started using the delta connection, since a shift to the star connection takes place upon entering stable operation in a low-load region as described above, the compressor 3 operates in the low-load region as a rule when the star connection is selected.

Therefore, a shift from the star connection to the delta connection takes place when there is a sudden increase in the compressor frequency required as a result of sudden room temperature fluctuations, a major change in the set temperature, or other conditions.

In such a case, even if the delta connection is superior in efficiency, if a shift to a connection switching operation is made by suddenly stopping operation in a state in which high capacity will be required, the user will feel odd. In that case, the room temperature is increased by operating within a range of up to maximum capacity with the star connection for a definite period of time, and then a shift is made to an operation of switching to the delta connection. However, even with the star connection, because the operation during the definite period of time involves high capacity operation, evaporating temperature of refrigerant in the outdoor-side heat exchanger 6 falls, producing frost on the outdoor-side heat exchanger 6. When only connection switching is done with frost still remaining and the compressor 3 is restarted with the delta connection, time wasted on the compressor stop is added and frost further grows after the switching to the delta connection, subsequently accelerating the timing of shifting to defrosting operation. Thus, during switching operation, even if the value detected by the temperature sensor 12 is above the prescribed value, the defrosting operation supposed to be performed subsequently is performed earlier.

At time B1 in FIG. 11, for example, a window or door is fully opened, causing a sudden air conditioning load fluctuations and the room temperature falls abruptly. In this case, because the compressor frequency exceeds a frequency threshold Nc, the operation runs in a region in which the delta connection should be selected, and if one attempts to switch the connection just when Nc is exceeded, a compressor stop will occur, running counter to load following. Thus, the room temperature is raised back by increasing the frequency with the star connection kept as it is and the connection is switched by stopping the compressor 3 at B3 after a definite period of time from B2. After the switch to the delta connection, the compressor is started at B4, and heating operation is resumed at B5 after going through defrosting operation. When the compressor is stopped for connection switching, if operation of the indoor-side fan 8 is continued as it is, the user feels chilly and unpleasant, which makes it necessary to stop operation of the indoor-side fan 8. For effective use of this downtime, after the switch to the delta connection, by shifting to defrosting operation first, the frost produced on the outdoor-side heat exchanger 6 by the preceding operation is first melted, and then a shift is made to heating operation with the delta connection. This makes it possible to delay the timing of next defrosting operation, and connection switching operations are included in the existing number of shutdowns by defrosting, which eliminates the need to increase the number of compressor stops in an entire heating period. This enables shifting to the delta connection while maintaining comfort.

During a shift from the star connection to the delta connection, the air conditioning load acts in such a direction as to require high capacity, and thus it is desirable that the time until a restart is short. Here, during the shift from the star connection to the delta connection, the time taken to eliminate differential pressure in the refrigerant circuit 100 is reduced by switching the four-way valve 4 and thereby reversing a refrigerant circulation before and after defrosting operation. That is, by inserting defrosting operation during switching from the star connection to the delta connection in heating operation, the waiting time for equalization of refrigerant pressure to prevent compressor failures is reduced. Consequently, downtime for connection switching can be reduced while curbing increases in the number of times of defrosting in the entire heating period, and switching can be done while maintaining comfort.

Air conditioning load fluctuations are temporary, and even if high frequency is required temporarily, if the air conditioning load goes toward stabilization when the compressor frequency falls below the frequency threshold again between B2 and B3 or if it is determined, based on air conditioning load detection information, estimation information, or other information, that operation at a frequency lower than the frequency threshold Nc will continue, switching from the star connection to the delta connection does not have to be done. For example, if the compressor frequency is lower than Nc between B2 and B3, switching from the star connection to the delta connection does not have to be done.

Figure 12:
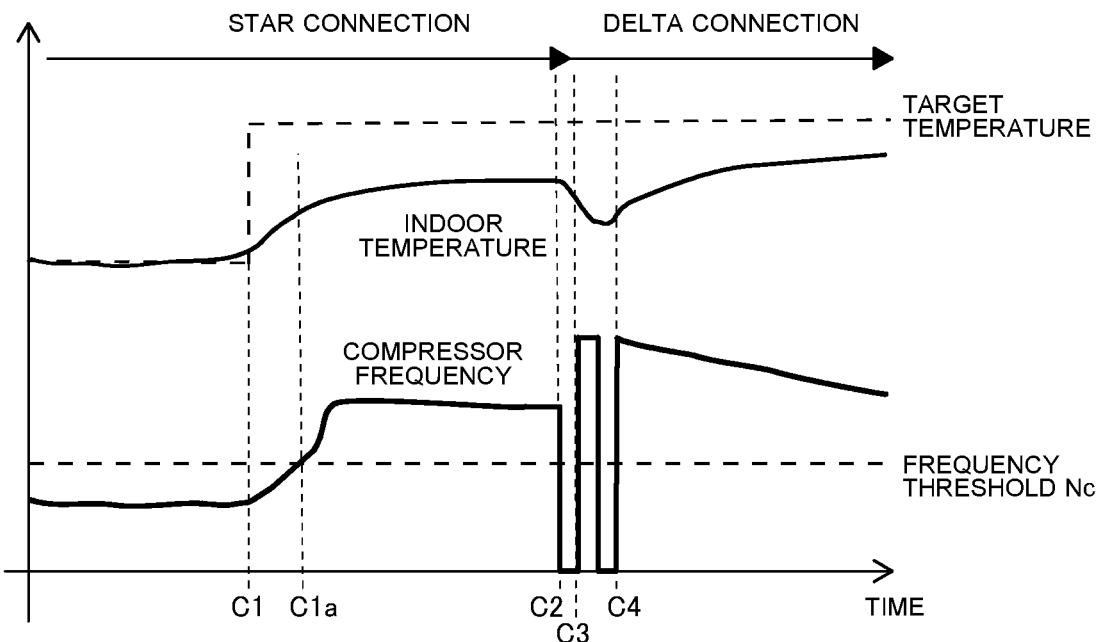
FIG. 12 is a schematic diagram showing an example of changes, with time, of compressor frequency during heating if target value fluctuations occur.

FIG. 12 is a schematic diagram showing an example of changes, with time, of compressor frequency during heating if target value fluctuations occur. During heating operation with the star connection, the target temperature rises at time C1, and the compressor frequency increases accordingly. Since operation is performed at frequencies above the frequency threshold Nc at time C1*a*, even though it is appropriate to operate using the delta connection, an attempt to perform a connection switching operation by stopping the compressor just after changing the set temperature runs counter to the intent of the user who is trying to increase the room temperature and will cause the user to feel odd. Thus, the room temperature is increased with the star connection kept as it is until time C2, switching to the delta connection is done between C2 and C3, defrosting operation is started at C3, and heating operation is resumed at C4. When the indoor temperature reaches the target temperature and thermo-off occurs between C1 and C2, the operation of switching to the delta connection does not have to be done.

During heating operation with the star connection, when it is determined that defrosting is needed based on the temperature detected by the temperature sensor 12, i.e., the temperature of the outdoor-side heat exchanger 6, and a shift to defrosting operation is made, switching to the delta connection is done at the time of a compressor stop before defrosting operation is started. Generally, it is more comfortable to finish defrosting operation in a short time and quickly return to heating operation, and thus the delta connection that can exhibit high defrosting capacity is always selected during defrosting operation.

When a sudden load fluctuation makes it necessary to shift from the star connection to the delta connection, priority is given to comfort, and consequently efficiency is not necessarily optimal. However, when the star connection is used, because the frequency at which too sudden load fluctuations to follow will occur is low in view of the actual status of use, load fluctuations do not have a significant impact on annual power consumption under standard conditions. Also, to make it possible to follow sudden load fluctuations using the star connection, the number of motor windings is selected in such a way as to enable operation at rated frequency even with the star connection.

Next, a control method in which the above-mentioned conditions for switching from the star connection to the delta connection are reflected will be described based on FIGS. 13 to 15. In the present embodiment, defrosting operation and connection switching are synchronized with each other.

Figure 13:
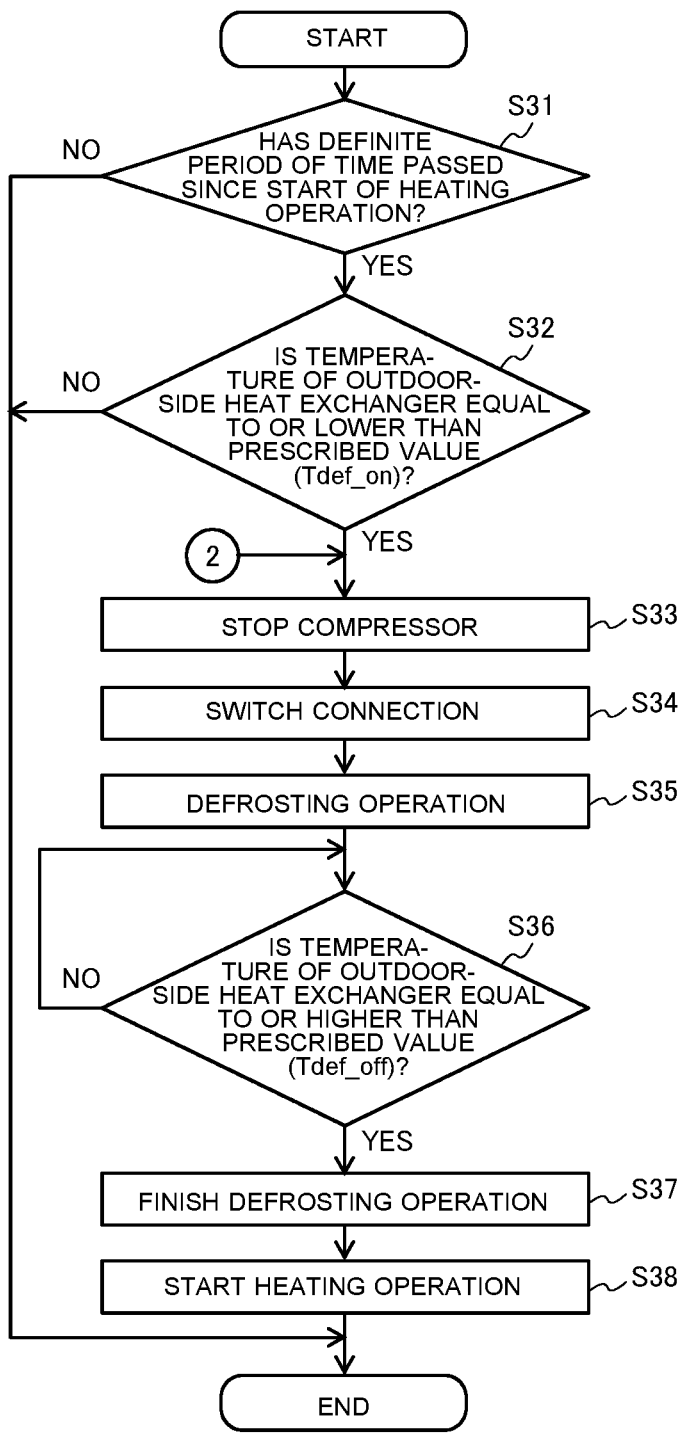
FIG. 13 is a flowchart (Part 1) of connection switching control for switching the stator windings of the electric motor from the star connection to the delta connection, showing an example in which operating time and outdoor-side heat exchanger temperature are used as start conditions of defrosting operation.

FIG. 13 is a flowchart (Part 1) of connection switching control for switching the stator windings of the electric motor from the star connection to the delta connection, showing an example in which operating time and outdoor-side heat exchanger temperature are used as start conditions of defrosting operation. The connection switching control is performed when the stator windings of the permanent magnet motor 25 are star-connected. The controller 21 determines whether a definite period of time has passed since the start of heating operation after an end of defrosting (S31). When it is determined that a definite period of time has passed, next the controller 21 determines whether the temperature detected by the temperature sensor 12 is equal to or lower than the prescribed value (Tdef_on) (S32). When it is determined that the temperature detected by the temperature sensor 12 is equal to or lower than the prescribed value (Tdef_on), the controller 21 determines that a condition for starting defrosting operation is satisfied. However, in the present embodiment, instead of shifting to defrosting operation immediately, first the controller 21 stops the compressor 3 (S33). With the compressor 3 stopped, the controller 21 switches from the star connection to the delta connection by controlling the connection switching device 24 (S34). Subsequently, the controller 21 starts defrosting operation using the delta connection (S35). That is, the controller 21 forms a cooling circuit by switching the four-way valve 4 and melts frost by the reverse defrosting method that involves restarting the compressor 3 and circulating the refrigerant. The defrosting operation is continued until the temperature detected by the temperature sensor 12 reaches or exceeds the prescribed value (Tdef_off) (S36). When the temperature detected by the temperature sensor 12 reaches or exceeds the prescribed value (Tdef_off), the controller 21 finishes the defrosting operation (S37). In finishing the defrosting operation, first the controller 21 stops the compressor 3, returns to the heating circuit by switching the four-way valve 4, and resumes heating operation by restarting the compressor 3 (S38). When the conditions are not satisfied in steps S31 and S32, i.e., when the determinations are NO, the processing is finished. Note that step 31 (S31) above may be omitted.

Figure 14:
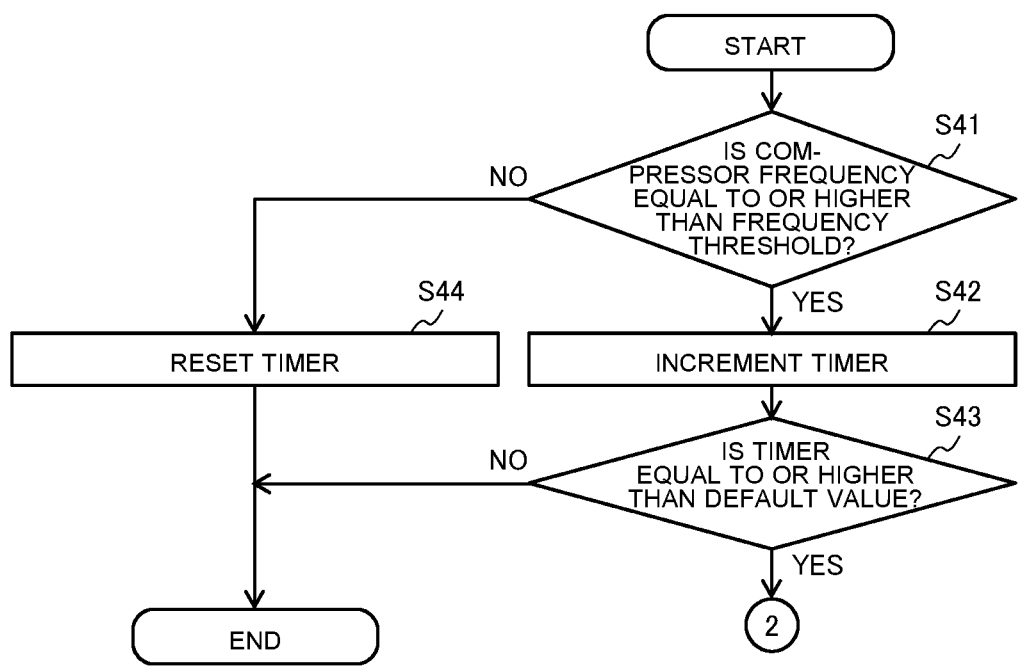
FIG. 14 is a flowchart (Part 2) of connection switching control for switching the stator windings of the electric motor from the star connection to the delta connection, showing an example in which compressor frequency is used as a start condition of defrosting operation.

FIG. 14 is a flowchart (Part 2) of connection switching control for switching the stator windings of the electric motor from the star connection to the delta connection, showing an example in which compressor frequency is used as a start condition of defrosting operation. The process of the flow chart is performed periodically. The controller 21 determines whether the compressor frequency is equal to or higher than the frequency threshold (S41). When it is determined that the compressor frequency is equal to or higher than the frequency threshold, the built-in timer 21a is incremented (S42). When the condition is not satisfied in step 41 (S41), the timer 21a is reset (S44). The controller 21 determines whether the value of the timer 21a is equal to or higher than a default value (S43). When the value of the timer 21a is equal to or higher than the default value, the controller 21 goes to step 33 (S33) of FIG. 13 by determining that the condition for the defrosting has been satisfied and carries out step 33 (S33) and subsequent processes of FIG. 13.

Figure 15:
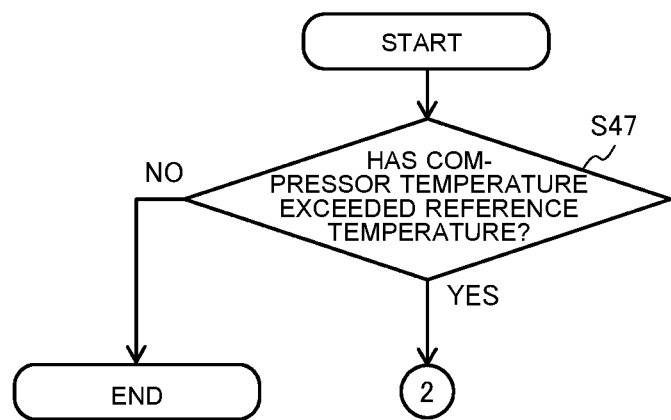
FIG. 15 is a flowchart (Part 3) of connection switching control for switching the stator windings of the electric motor from the star connection to the delta connection, showing an example in which compressor temperature is used as a start condition of defrosting operation.

FIG. 15 is a flowchart (Part 3) of connection switching control for switching the stator windings of the electric motor from the star connection to the delta connection, showing an example in which the temperature of the compressor 3 is used as a start condition of defrosting operation. The controller 21 determines whether the temperature detected by the temperature sensor 10, i.e., the temperature of the compressor 3, exceeds reference temperature (S47). When the reference temperature is exceeded, the controller 21 goes to step 33 (S33) of FIG. 13 and carries out step 33 (S33) and subsequent processes of FIG. 13. Note that the reference temperature in step 47 (S47) above is set from the viewpoint of protecting the compressor 3. The above description assumes heating operation, and in the case of cooling operation, the cooling operation is continued after the connection switching process by omitting defrosting control.

Variations

Figure 16:
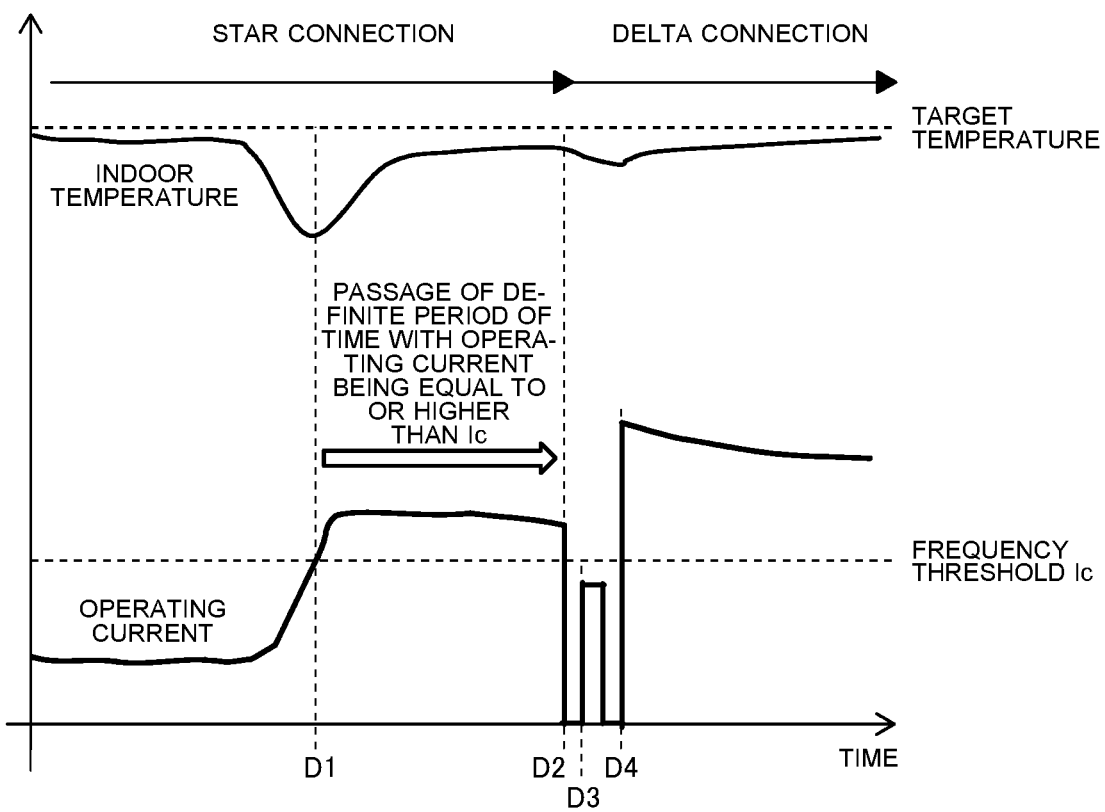
FIG. 16 is a schematic diagram showing another example of changes, with time, of compressor frequency during heating if load fluctuations occur.

An example focusing on compressor frequency has been described above in FIG. 14. However, because there is a correlation between the frequency and operating current of the compressor 3, the operating current of the compressor 3 may be used instead of the compressor frequency. FIG. 16, which corresponds to FIG. 11, is a schematic diagram showing an example of changes, with time, of the compressor operating current during heating if load fluctuations occur. In this example, connection is switched under conditions that a state in which the room temperature is lower than the target temperature and the operating current of the compressor 3 is higher than an operating current threshold Ic continues for a definite period of time.

Figure 17:
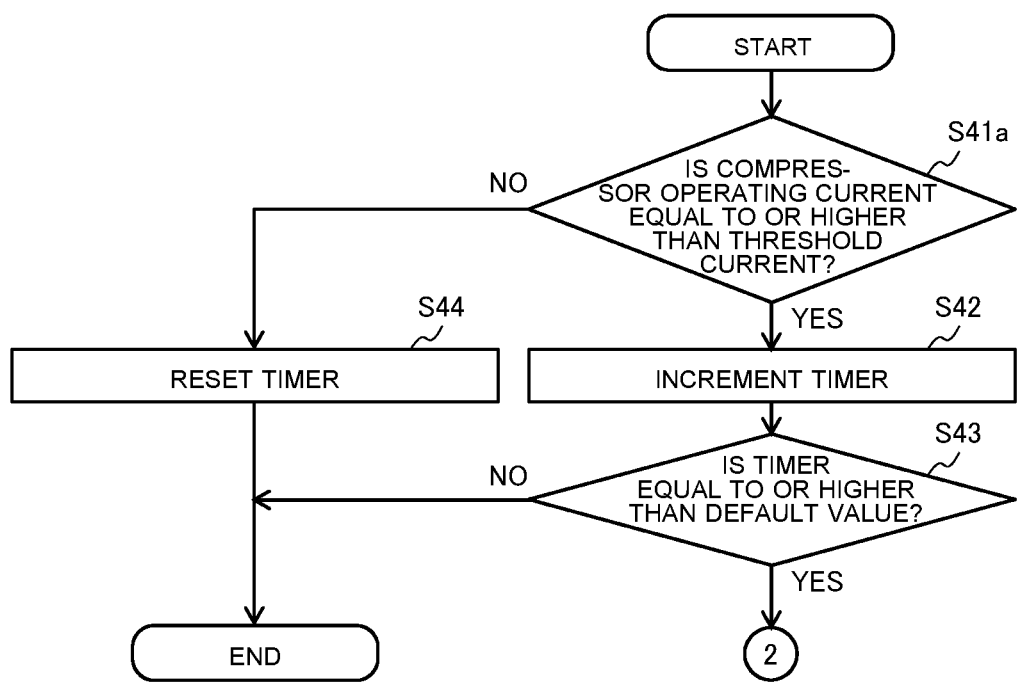
FIG. 17 is a variation of FIG. 14 showing an example in which a compressor operating current is used as a start condition of defrosting operation.

FIG. 17 is a variation of FIG. 14 and is an example in which the operating current of the compressor 3 is used as a start condition of defrosting operation. Step 41 (S41) of FIG. 14 is replaced with step 41a (S41a). The controller 21 determines whether the operating current of the compressor 3 is equal to or higher than the operating current threshold Ic (S41a). When it is determined that the operating current of the compressor 3 is equal to or higher than the operating current threshold Ic, the built-in timer 21a is incremented (S42). The other processes are the same as the processes of FIG. 14. Connection switching and defrosting are done under a condition that a state in which the operating current of the compressor 3 is higher than the operating current threshold Ic continues for a definite period of time.

As described above, the present embodiment switches connection from the star connection to the delta connection, offering the following advantageous effects.

In the present embodiment, to perform defrosting operation with the stator windings star-connected during heating operation, the connection of the stator windings is switched from the star connection to the delta connection. That is, switching from the star connection to the delta connection is done in synchronization with defrosting operation. This makes it possible to switch connection without increasing the stop frequency of the compressor 3 compared to conventional stop frequency and thereby reduce unpleasantness caused by a compressor stop during connection switching. Besides, the shift from the star connection to the delta connection provides high capacity in a high-load region. Also, the accuracy of determination as to which connection is more appropriate for operation is increased. This makes it possible to reduce unnecessary connection switching and maintain comfort. In this way, the present embodiment combines energy efficiency in a low-load region and high capacity in a high-load region without impairing comfort.

Also, in the present embodiment, when a state in which the room temperature is lower than the target temperature continues for a first reference time, the connection of the stator windings is switched from the star connection to the delta connection. That is, connection switching from the star connection to the delta connection is done in conjunction with defrosting operation. This makes it possible to switch connection without increasing the stop frequency of the compressor 3 compared to conventional stop frequency and thereby reduce unpleasantness caused by a compressor stop during connection switching. Besides, the shift from the star connection to the delta connection provides high capacity in a high-load region. Also, the accuracy of determination as to which connection is more appropriate for operation is increased. This makes it possible to reduce unnecessary connection switching and maintain comfort. In this way, the present embodiment combines energy efficiency in a low-load region and high capacity in a high-load region without impairing comfort.

Also, in the present embodiment, during operation with the stator windings star-connected, when the temperature of the outdoor-side heat exchanger 6 is equal to or lower than the first reference temperature, the connection of the stator windings is switched from the star connection to the delta connection using the connection switching device 24. This further increases accuracy of determination on switching to the delta connection.

Also, in the present embodiment, during operation with the stator windings star-connected, when a state in which the compressor frequency is equal to or higher than the frequency threshold continues for the second reference time, the connection of the stator windings is switched from the star connection to the delta connection. This further increases the accuracy of determination on switching to the delta connection.

Also, in the present embodiment, during operation with the stator windings star-connected, when a state in which the operating current of the compressor 3 is equal to or higher than the operating current threshold continues for the second reference time, the connection of the stator windings is switched from the star connection to the delta connection. This further increases the accuracy of determination on switching to the delta connection.

Also, in the present embodiment, during operation with the stator windings star-connected, when the temperature of the compressor 3 exceeds the reference temperature, the connection of the stator windings is switched from the star connection to the delta connection. The operation in this case may be either heating or cooling, and from the viewpoint of protection of the compressor 3, the delta connection is used for the stator windings. However, during heating operation, a shift to defrosting operation is made after connection switching.

Also, in the present embodiment, the defrosting operation is performed after the connection of the stator windings is switched from the star connection to the delta connection. That is, the switching from the star connection to the delta connection is done in synchronization with defrosting operation. This makes it possible to switch connection without increasing the stop frequency of the compressor 3 compared to conventional stop frequency and thereby reduce unpleasantness caused by a compressor stop during connection switching.

Also, in the present embodiment, by stopping the compressor 3, the connection switching device 24 is caused to switch connection, with the compressor 3 stopped. Consequently, even if there is variation in operating characteristics of the C contact relays 24a to 24c making up the connection switching device 24, safety of products is ensured without inconvenience.

| Reference Signs List | | | |
|---|---|---|---|
| 1 indoor unit | 2 outdoor unit | 3 compressor | 4 four-way valve |
| 5 indoor-side heat exchanger | 6 outdoor side heat exchanger | 7 expansion valve | |
| 8 indoor-side fan | 9 outdoor-side fan | 10 to 12 temperature sensor | |
| 16a, 16b glass terminal | 21 controller | 21a timer | 22 storage device |
| 23 drive circuit | 24 connection switching device | 24a to 24c C contact relay | |
| 25 permanent magnet motor | 100 refrigerant circuit | | |

The invention claime is:

1. An air-conditioning apparatus comprising:
a compressor incorporating an electric motor;
a temperature sensor configured to detect indoor temperature;
a driver configured to drive the electric motor;
a connection switch configured to switch connection of stator windings of the electric motor between a first connection state and a second connection state higher in line-to-line voltage than the first connection state;
a controller configured to enter thermo-off when the indoor temperature reaches one of a target temperature or a correction temperature that is set based on the target temperature, and configured to cause the connection switch to switch connection, the thermo-off being entered by stopping the compressor via the driver; and
a temperature sensor configured to detect temperature of the compressor,
wherein
the controller causes the connection switch to switch the connection of the stator windings during the thermo-off, and
with the electric motor operating in the first connection state, the controller does not control the connection switching to switch from the first connection state to the second connection state when the temperature of the compressor is equal to or higher than a reference temperature, even if a condition for switching from the first connection state to the second connection state is satisfied.

2. The air-conditioning apparatus of claim 1, wherein
a thermo-off count is incremented when the controller enters the thermo-off and an operating frequency of the compressor immediately prior to the thermo-off is equal to or lower than a frequency threshold, and
when the thermo-off count reaches a reference count, the controller causes the connection switch to switch the connection from the first connection state to the second connection state.

3. The air-conditioning apparatus of claim 1, wherein when a duration of the thermo-off exceeds a reference time, the controller causes the connection switch to switch the connection from the first connection state to the second connection state.

4. The air-conditioning apparatus of claim 1, wherein when a reference time is exceeded during a period from a first count of thermo-off until a reference count is reached, the controller resets a thermo-off count.

5. The air-conditioning apparatus of claim 1, wherein when the controller performs a defrosting operation to remove frost from an outdoor-side heat exchanger, the controller resets a thermo-off count.

6. The air-conditioning apparatus of claim 1, wherein the controller does not control the connection switching before elapse of a reference time from a start of operation of the air-conditioning apparatus.

7. An air-conditioning apparatus comprising:
a compressor incorporating an electric motor;
a temperature sensor configured to detect indoor temperature;
a driver configured to drive the electric motor;
a connection switch configured to switch connection of stator windings of the electric motor between a first connection state and a second connection state higher in line-to-line voltage than the first connection state;
a controller configured to enter thermo-off when the indoor temperature reaches one of a target temperature or a correction temperature that is set based on the target temperature, and configured to cause the connection switch to switch connection, the thermo-off being entered by stopping the compressor via the driver; and
a temperature sensor configured to detect a temperature of the compressor,
wherein
the controller causes the connection switch to switch the connection of the stator windings during the thermo-off, and during operation with the stator windings being in the second connection state, when temperature of the compressor exceeds a reference temperature, the controller causes the connection switch to switch the connection of the stator windings from the second connection state to the first connection state.

8. The air-conditioning apparatus of claim 1, further comprising a storage device wherein
the storage device prestores a reference count and stores a thermo-off count.

9. The air-conditioning apparatus of claim 1, wherein in the first connection state, the stator windings are delta-connected, and in the second connection state, the stator windings are star-connected.

10. The air-conditioning apparatus of claim 1, wherein in the first connection state, the stator windings are connected in parallel on a phase by phase basis, and in the second connection state, the stator windings are connected in series on a phase by phase basis.

11. The air-conditioning apparatus of claim 1, wherein when a thermo-off count reaches a reference count, the controller causes the connection switch to switch the connection of the stator windings from the first connection state to the second connection state.

* * * * *